(12) United States Patent
Kinstler

(10) Patent No.: US 9,090,360 B2
(45) Date of Patent: Jul. 28, 2015

(54) CRYOGENICALLY COOLED RADIATION SHIELD DEVICE AND ASSOCIATED METHOD

(71) Applicant: The Boeing Company, Chicago, IL (US)

(72) Inventor: Gary A. Kinstler, Torrance, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 14/461,994

(22) Filed: Aug. 18, 2014

(65) Prior Publication Data

US 2015/0144739 A1 May 28, 2015

Related U.S. Application Data

(60) Division of application No. 12/966,350, filed on Dec. 13, 2010, now Pat. No. 8,809,824, which is a continuation-in-part of application No. 12/966,315, filed on Dec. 13, 2010, now Pat. No. 8,575,580.

(51) Int. Cl.
| | |
|---|---|
| *B64G 1/52* | (2006.01) |
| *B64G 1/58* | (2006.01) |
| *B64G 1/54* | (2006.01) |
| *G21F 1/00* | (2006.01) |
| *G21F 3/00* | (2006.01) |

(52) U.S. Cl.
CPC .. *B64G 1/58* (2013.01); *B64G 1/54* (2013.01); *G21F 1/00* (2013.01); *G21F 3/00* (2013.01)

(58) Field of Classification Search
USPC .............. 244/171.7, 171.8, 172.2; 250/505.1, 250/515.1
See application file for complete search history.

(56) References Cited

U.S. PATENT DOCUMENTS

| | | | | | |
|---|---|---|---|---|---|
| 3,130,413 | A | * | 4/1964 | Schueller | ......................... 2/2.11 |
| 3,224,375 | A | * | 12/1965 | Hoff | ......................... 244/159.1 |
| 3,378,691 | A | * | 4/1968 | Swartz | ............................ 307/91 |
| 3,801,942 | A | * | 4/1974 | Elsel | ............................. 335/216 |
| 3,842,751 | A | | 10/1974 | Thornton et al. | |
| 4,058,945 | A | | 11/1977 | Knapp | |

(Continued)

OTHER PUBLICATIONS

Hoffman, J., et al.; "Use of Superconducting Magnet Technology for Astronaut Radiation Protection"; dated May 5, 2005 at the MIT-NASA Radiation Shielding Workshop, Cambridge, MA; 38 pages.

(Continued)

*Primary Examiner* — Tien Dinh
*Assistant Examiner* — Assres H Woldemaryam
(74) *Attorney, Agent, or Firm* — Alston & Bird LLP

(57) ABSTRACT

A cryogenically cooled radiation shield device and method are provided to shield an area, such as the capsule of a space vehicle, from radiation. A cryogenically cooled radiation shield device may include at least one first coil comprised of a superconducting material extending about an area to be shielded from radiation. The cryogenically cooled radiation shield device also includes a first conduit extending about the area to be shielded from radiation. The at least one first coil is disposed within the first conduit. The cryogenically cooled radiation shield device also includes a second conduit extending about the area to be shielded from radiation. The first conduit is disposed within the second conduit. The cryogenically cooled radiation shield device also includes a first cryogen liquid disposed within the first conduit and a second cryogen liquid, different than the first cryogen liquid, disposed within the second conduit exterior of the first conduit.

20 Claims, 8 Drawing Sheets

(56) References Cited

U.S. PATENT DOCUMENTS

| | | | |
|---|---|---|---|
| 4,260,035 A | 4/1981 | Loveless et al. | |
| 4,291,541 A | 9/1981 | Kneip, Jr. et al. | |
| 4,401,986 A | 8/1983 | Trenkler et al. | |
| 4,507,639 A | 3/1985 | Trenkler et al. | |
| 4,584,577 A | 4/1986 | Temple | |
| 4,639,667 A | 1/1987 | Andresen | |
| 4,651,130 A | 3/1987 | Pennell | |
| 4,719,381 A | 1/1988 | Miles | |
| 4,733,214 A | 3/1988 | Andresen | |
| 4,796,432 A * | 1/1989 | Fixsen et al. | 62/51.1 |
| 4,908,558 A | 3/1990 | Lordo et al. | |
| 5,012,217 A * | 4/1991 | Palkovich et al. | 335/301 |
| 5,317,879 A | 6/1994 | Goldberg et al. | |
| 5,379,600 A * | 1/1995 | Moritsu et al. | 62/47.1 |
| 5,929,846 A | 7/1999 | Rosenberg et al. | |
| 6,320,284 B1 | 11/2001 | Fontana et al. | |
| 6,481,670 B1 * | 11/2002 | Bigelow et al. | 244/171.8 |
| 6,664,666 B2 | 12/2003 | Corcoran | |
| 6,977,571 B1 * | 12/2005 | Hollis et al. | 335/216 |
| 7,061,466 B1 | 6/2006 | Moore et al. | |
| 7,394,173 B2 | 7/2008 | Cope et al. | |
| 7,464,901 B2 * | 12/2008 | Kinstler | 244/171.7 |
| 7,484,691 B2 * | 2/2009 | Kinstler | 244/171.7 |
| 7,780,118 B2 * | 8/2010 | Bigelow | 244/171.7 |
| 7,990,662 B2 | 8/2011 | Berkley et al. | |
| 8,054,077 B2 | 11/2011 | Hsieh et al. | |
| 8,210,481 B2 * | 7/2012 | Kinstler | 244/171.7 |
| 8,264,458 B2 | 9/2012 | Cooper et al. | |
| 2002/0053849 A1 | 5/2002 | Corcoran | |
| 2006/0060718 A1 * | 3/2006 | Bigelow | 244/171.7 |
| 2006/0169931 A1 | 8/2006 | Kinstler | |
| 2008/0054745 A1 | 3/2008 | Sentmanat | |
| 2008/0307801 A1 | 12/2008 | Tanaka et al. | |
| 2009/0038318 A1 | 2/2009 | Begg et al. | |
| 2009/0084903 A1 * | 4/2009 | Kinstler | 244/171.7 |
| 2009/0233797 A1 * | 9/2009 | Schlenga et al. | 505/163 |
| 2010/0187365 A1 * | 7/2010 | Kutter et al. | 244/171.7 |
| 2010/0323900 A1 | 12/2010 | Kawashima | |

OTHER PUBLICATIONS

Hoffman, J., et al.; "Use of Superconducting Magnet Technology for Astronaut Radiation Protection"; NIAC Phase I Fellows Meeting; Atlanta, Georgia; Mar. 15-16, 2005.

Technovelgy.com; "Superconduction Magnetic Bubble to Protect Astronauts from Radiation"; downloaded from http://www.technovelgy.com/ct/Science-Fiction/News.asp?NewsNum=289 on Nov. 2, 2010; 3 pages.

Augustynowicz, S.D., et al.; "Cryogenic Insulation System for Soft Vacuum"; 1999; 8 pages.

Harrison et al., 'Cryogenic System for a Large wsuperconducting Magent in Space', pp. 1,2.

* cited by examiner

CRYOGENICALLY COOLED RADIATION SHIELD DEVICE AND ASSOCIATED METHOD

CROSS REFERENCE TO RELATED APPLICATIONS

This application is a divisional of and claims priority to U.S. application Ser. No. 12/966,350, filed Dec. 13, 2010, which is a continuation-in-part of U.S. application Ser. No. 12/966,315, filed Dec. 13, 2010, the entire contents of each are hereby incorporated by reference.

TECHNOLOGICAL FIELD

Embodiments of the present disclosure relate generally to methods and devices for shielding an area from radiation and, more particularly, to a cryogenically cooled radiation shield device and an associated method.

BACKGROUND

The sun occasionally releases significant amounts of charged particles during events known as coronal mass ejectas ("CMEs"). The charged particles released during CMEs include electrons, protons, and heavy ions. Each CME may last for about one or two days in the vicinity of earth, but their effects may linger for up to a week. Such proton and heavy ion radiation can cause cell damage to humans exposed to such radiation. Additionally, sensitive electronic components and other devices may be adversely affected by such radiation. Therefore, even though CMEs are relatively uncommon occurrences, the amounts of radiation they could potentially inflict upon a crew and equipment of a spacecraft suggests that consideration be given to shielding part or all of a spacecraft from such radiation. Similarly, comparable radiation protection may be desirable in other environments as well, such as habitats for celestial bodies such as the moon and Mars.

Shielding from proton and heavy ion radiation may generally be accomplished by either absorbing the particles or by deflecting the particles. To absorb the radiation, materials of a thickness sufficient for the amount of energy expected from the radiation, can be provided around an area that houses the crew and/or sensitive equipment during a CME. However, because of the significant amount of weight such a housing would require, the use of radiation absorbing material is not practical for space exploration and other applications. Additionally, the absorption of high energy particles may release a different form of radiation such as gamma rays and X-rays that pass through the shielding material and create other difficulties for the crew and/or equipment.

It may therefore be preferable to deflect the particles of radiation rather than absorb them. In order to deflect particles of radiation, active radiation shield devices have been proposed. An active radiation shield device may include one or more coils that extend about an area to be shielded, such as about a spacecraft or the like. By passing current through the coil(s) of the radiation shield device, a magnetic field may be generated that deflects particles of radiation that may otherwise impinge upon the spacecraft.

In order to facilitate the generation of the protective magnetic field, a radiation shield device may include coils formed of a superconductive material. The coils formed of the superconductive material must therefore be maintained at a temperature below its critical superconducting temperature onset level and as close to absolute zero as practical. As such, the coils formed of a superconductive material may be initially cooled from an ambient temperature and then maintained at a temperature below its critical superconducting temperature onset level by electrical refrigeration units. However, the electrical refrigeration units may be relatively heavy and may consume a substantial amount of electrical power. In addition, the electrical refrigeration unit may require electrical power generation and distribution, which also disadvantageously adds to the overall weight of the system.

As it is often desirable to reduce the weight of a spacecraft, it may therefore be undesirable to include an electrical refrigeration unit and the associated electrical power generation distribution system in order to cool the coils formed of a superconducting material to a temperature near absolute zero. As such, radiation shield devices, including coils formed of a superconductive material, may alternatively immerse the coils in liquid helium, which lowers the temperature of the coils from an ambient temperature, such as about 23° C., to a temperature required for superconducting operations, such as −269° C., as a result of the boil-off vaporization of the liquid helium. Since the latent heat of the liquid helium is relatively low, however, an excessive amount of liquid helium, as measured in terms of the weight and volume of the liquid helium, may need to be boiled off in order to cool the coils. As such, a substantial quantity of liquid helium may be required to be provided in order to sufficiently cool the coils formed of a superconductive material, thereby disadvantageously increasing the weight of the spacecraft or the like.

BRIEF SUMMARY

A cryogenically cooled radiation shield device as well as an associated method are provided according to embodiments of the present disclosure in order to shield an area, such as the capsule of a space vehicle, from radiation, such as the charged particles released during CMEs. In this regard, the cryogenically cooled radiation shield device and associated method of one embodiment are configured to deflect the particles of radiation in a manner that is lighter and/or consumes less cryogen liquid than some prior approaches.

In one embodiment, a cryogenically cooled radiation shield device is provided that includes at least one first coil comprised of a superconducting material extending about an area to be shielded from radiation. The cryogenically cooled radiation shield device also includes a first conduit extending about the area to be shielded from radiation. The at least one first coil is disposed within the first conduit. The cryogenically cooled radiation shield device also includes a second conduit extending about the area to be shielded from radiation. The first conduit is disposed within the second conduit. The cryogenically cooled radiation shield device also includes a first cryogen liquid disposed within the first conduit and a second cryogen liquid, different than the first cryogen liquid, disposed within the second conduit exterior of the first conduit. In one embodiment, the cryogenically cooled radiation shield device may also include thermal insulation surrounding the second conduit.

The first cryogen liquid may have a lower boiling point than the second cryogen liquid. For example, the first cryogen liquid may comprise liquid helium, and the second cryogen liquid may be liquid oxygen, liquid nitrogen or liquid hydrogen. In one embodiment, the cryogenically cooled radiation shield device also includes at least one second coil comprised of a superconductive material and extending about the area to be shielded from radiation, third and fourth conduits extending about the area to be shielded from radiation with the at least one second coil being disposed within the third conduit and the third conduit being disposed within the fourth conduit, and first and third cryogen liquids disposed within the third and fourth conduits, respectively, with the third cryogen liquid being different than the first and second cryogen liquids. In this embodiment, the second cryogen liquid may comprise liquid hydrogen, and the third cryogen liquid may comprise liquid oxygen. Further, the cryogenically cooled radiation shield device of this embodiment may also include a fuel cell configured to receive boil-off of the second and third cryogen liquids.

In another embodiment, a space vehicle is provided that includes a capsule and a radiation shield device. The radiation shield device includes at least one first coil comprised of a superconductive material extending about the capsule. The radiation shield device also includes first and second conduits extending about the capsule. The at least one first coil is disposed within the first conduit. The first conduit is, in turn, disposed within the second conduit. The radiation shield device of this embodiment also includes first and second cryogen liquids disposed within the first and second conduits, respectively. In one embodiment, the radiation shield device may also include thermal insulation surrounding the second conduit.

The first cryogen liquid of one embodiment has a lower boiling point than the second cryogen liquid. For example, the first cryogenic liquid may be liquid helium, and the second cryogen liquid may be liquid oxygen, liquid nitrogen, or liquid hydrogen. The radiation shield device of one embodiment may also include at least one second coil comprised of a superconductive material and extending about the capsule, third and fourth conduits extending about the capsule with the at least one second coil disposed within the third conduit, and the third conduit disposed within the fourth conduit. The radiation shield device of this embodiment also includes first and third cryogen liquids disposed within the third and fourth conduits, respectively, with the third cryogen liquid being different than the first and second cryogen liquids. In this regard, the second cryogen liquid may be liquid hydrogen, and the third cryogen liquid may be liquid oxygen. The space vehicle of one embodiment may also include a fuel cell configured to receive boil-off of the second and third cryogen liquids.

In a further embodiment, a method of cryogenically cooling a radiation shield device is provided that includes cryogenically cooling at least one first coil comprised of a superconductive material. The cryogenic cooling includes circulating a first cryogen liquid through a first conduit in which at least one first coil is disposed and circulating a second cryogen liquid, different than the first cryogen liquid, through a second conduit in which the first conduit is disposed. The method of this embodiment also generates a protective magnetic field by providing current flow through the at least one first coil while the at least one first coil is cryogenically cooled.

In one embodiment, the at least one first coil may be precooled prior to commencement of the mission, thereby reducing the quantity of cryogen liquid that must be carried during the mission. The first cryogen liquid may have a lower boiling point than the second cryogen liquid. For example, the first cryogen liquid may be liquid helium, and the second cryogen liquid may be liquid oxygen, liquid nitrogen, or liquid hydrogen. In one embodiment, the circulation of a second cryogen liquid may include the sequential circulation of a plurality of different cryogen liquids through the second conduit. In this embodiment, the plurality of different cryogen liquids may be sequentially circulated through the second conduit in order of descending boiling point. Accordingly, the circulation of the first cryogen liquid through the first conduit may commence following the sequential circulation of a plurality of different cryogen liquids through the second conduit.

In accordance with embodiments of the present disclosure, a cryogenically cooled radiation shield device and an associated method are provided in order to deflect particles of radiation in a manner that is conservative in terms of its weight and its consumption of liquid cryogen. However, the features, functions and advantages that have been discussed may be achieved independently and the various embodiments of the present disclosure may be combined in the other embodiments, further details of which may be seen with reference to the detailed description and drawings.

BRIEF DESCRIPTION OF THE DRAWINGS

Figure 1:
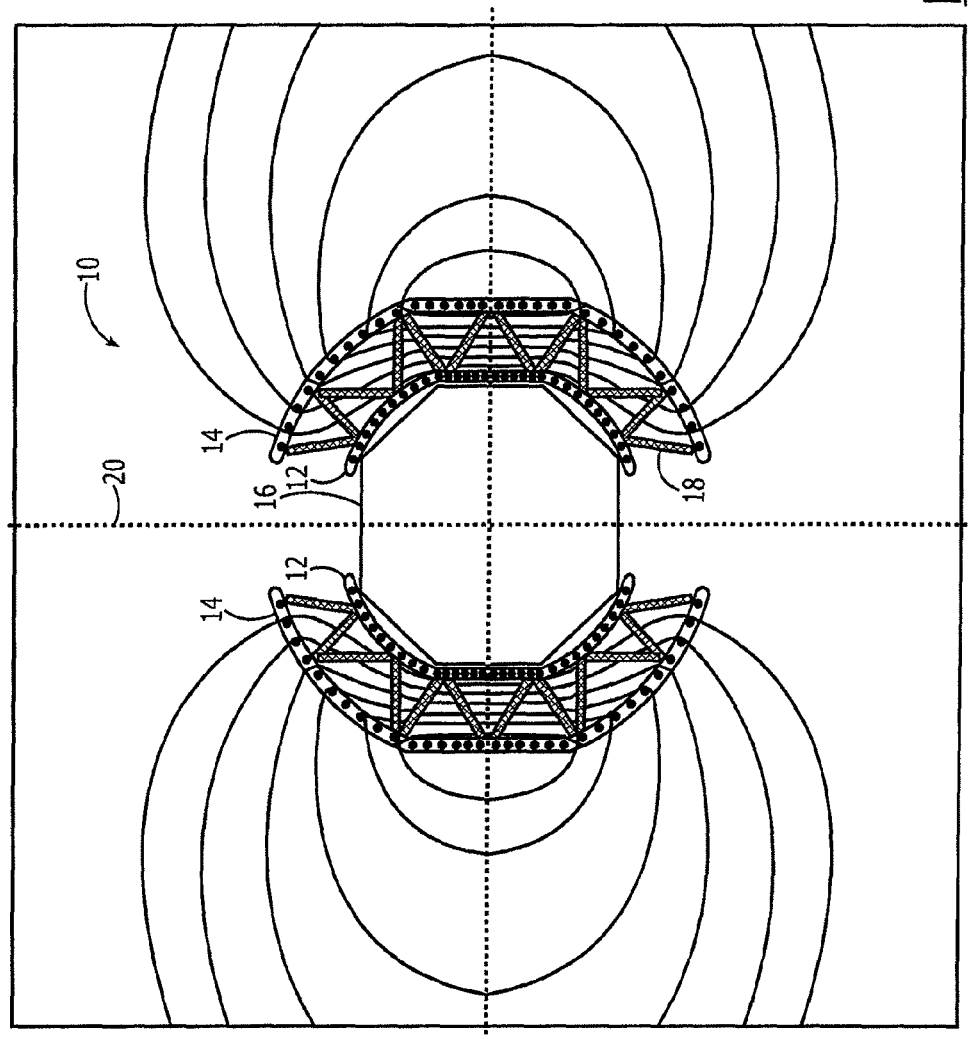
Figure 2:
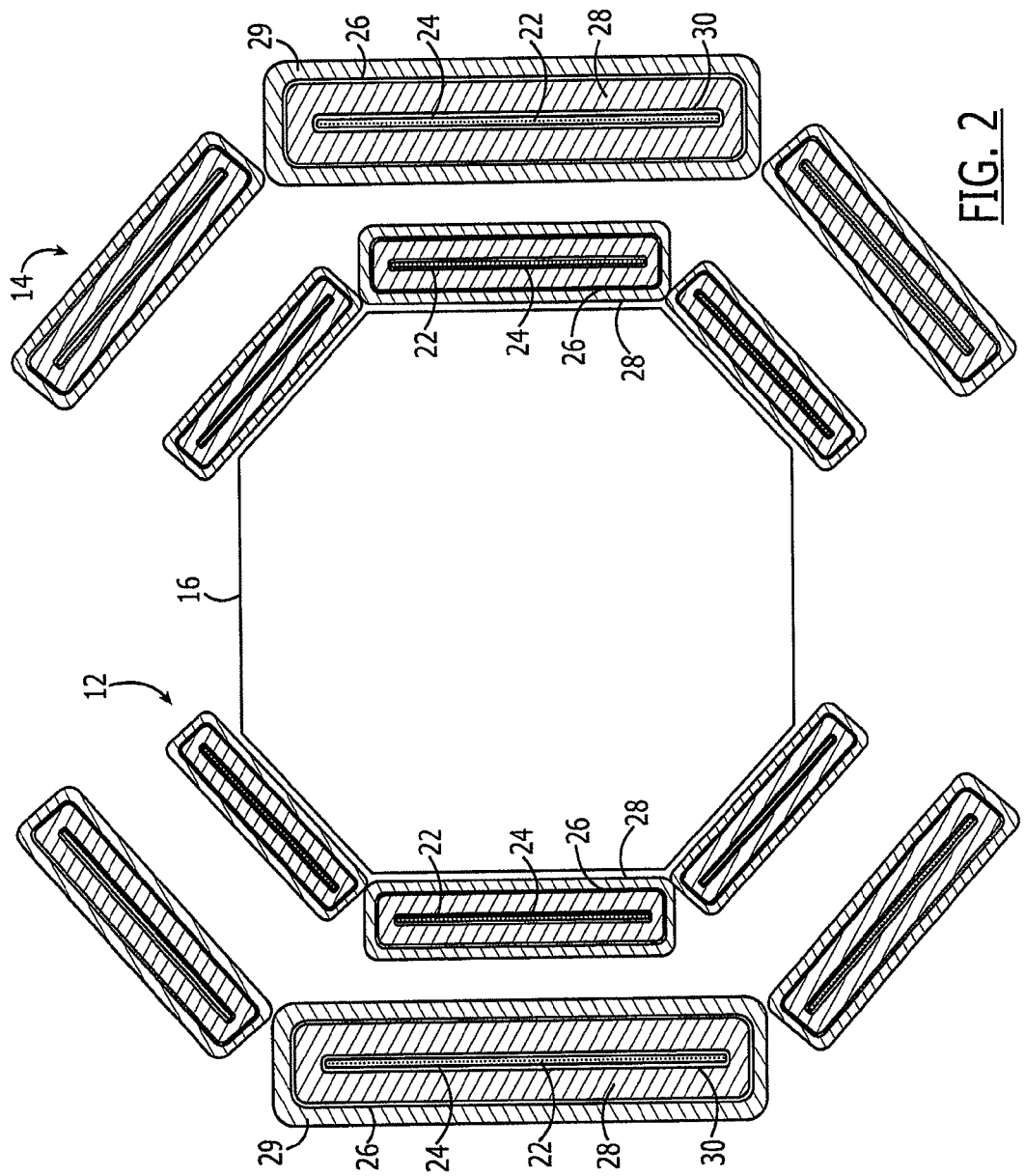
Figure 3:
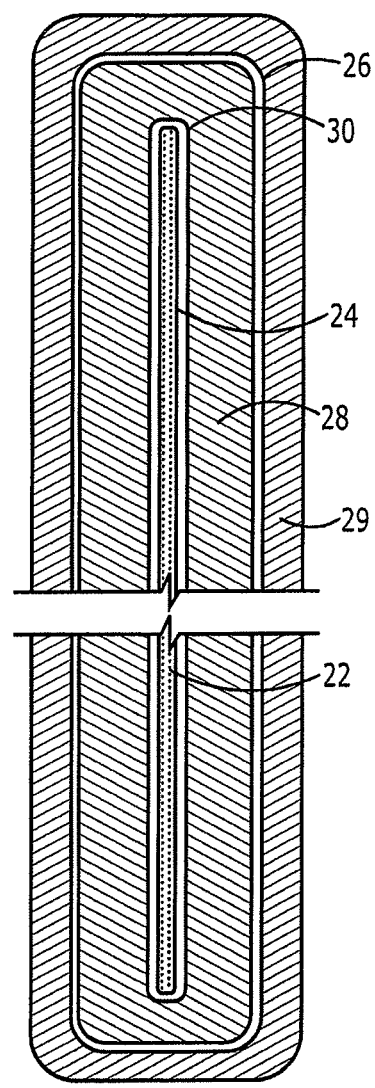
Figure 4:
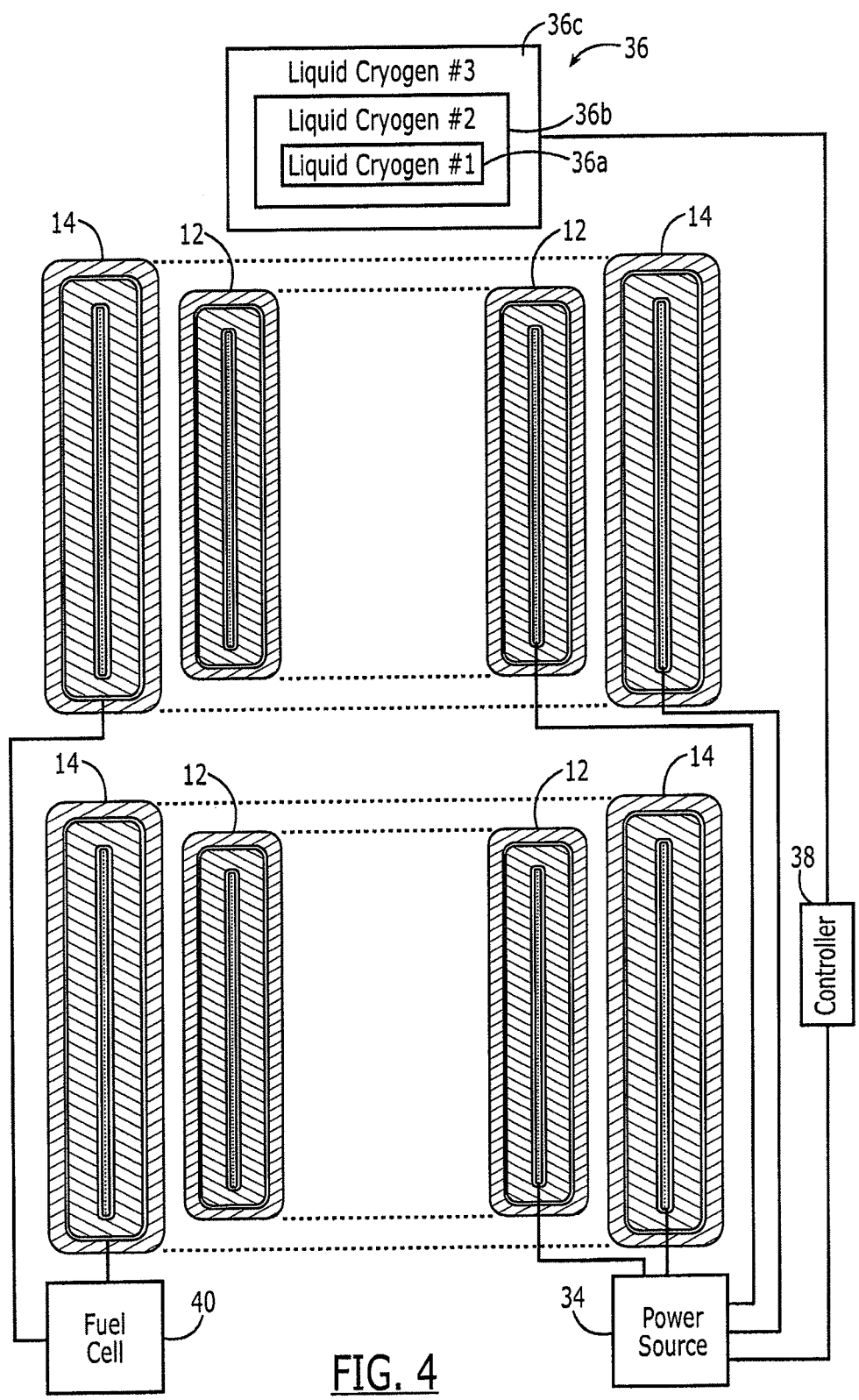
Figure 5:
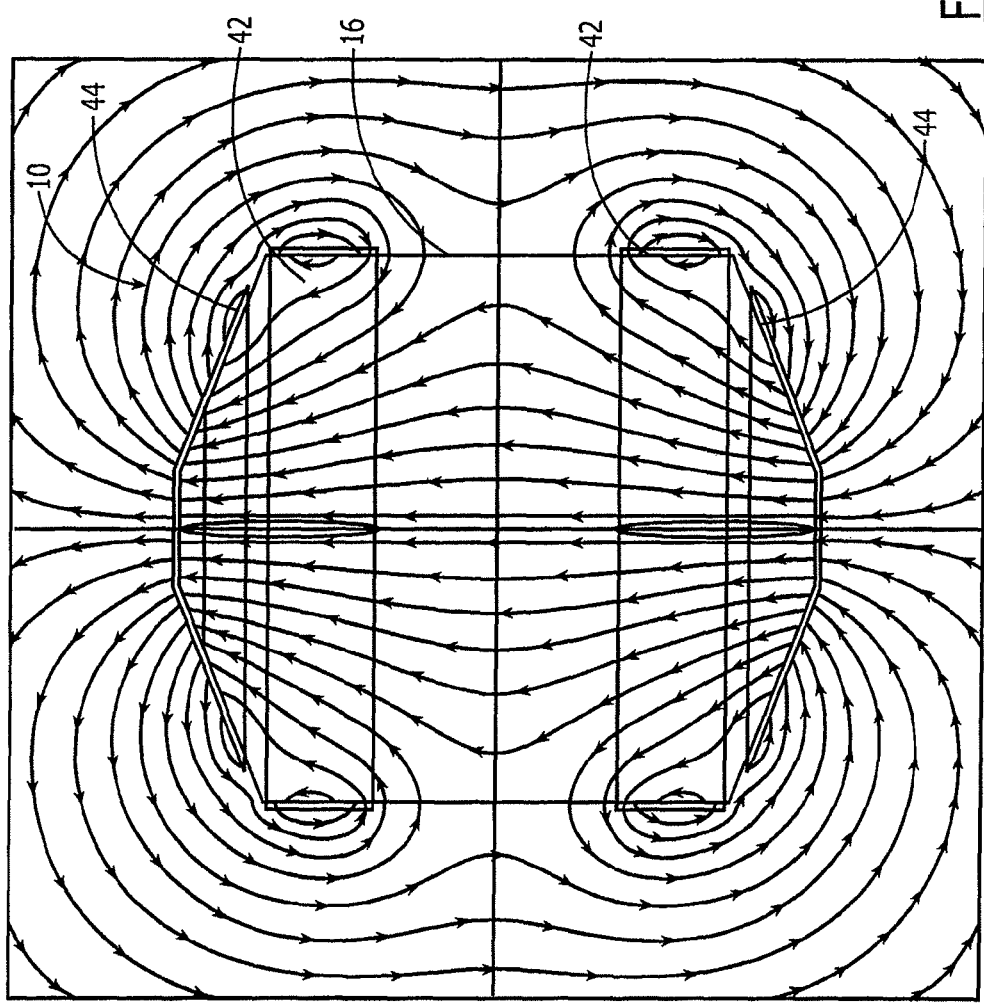
Figure 6:
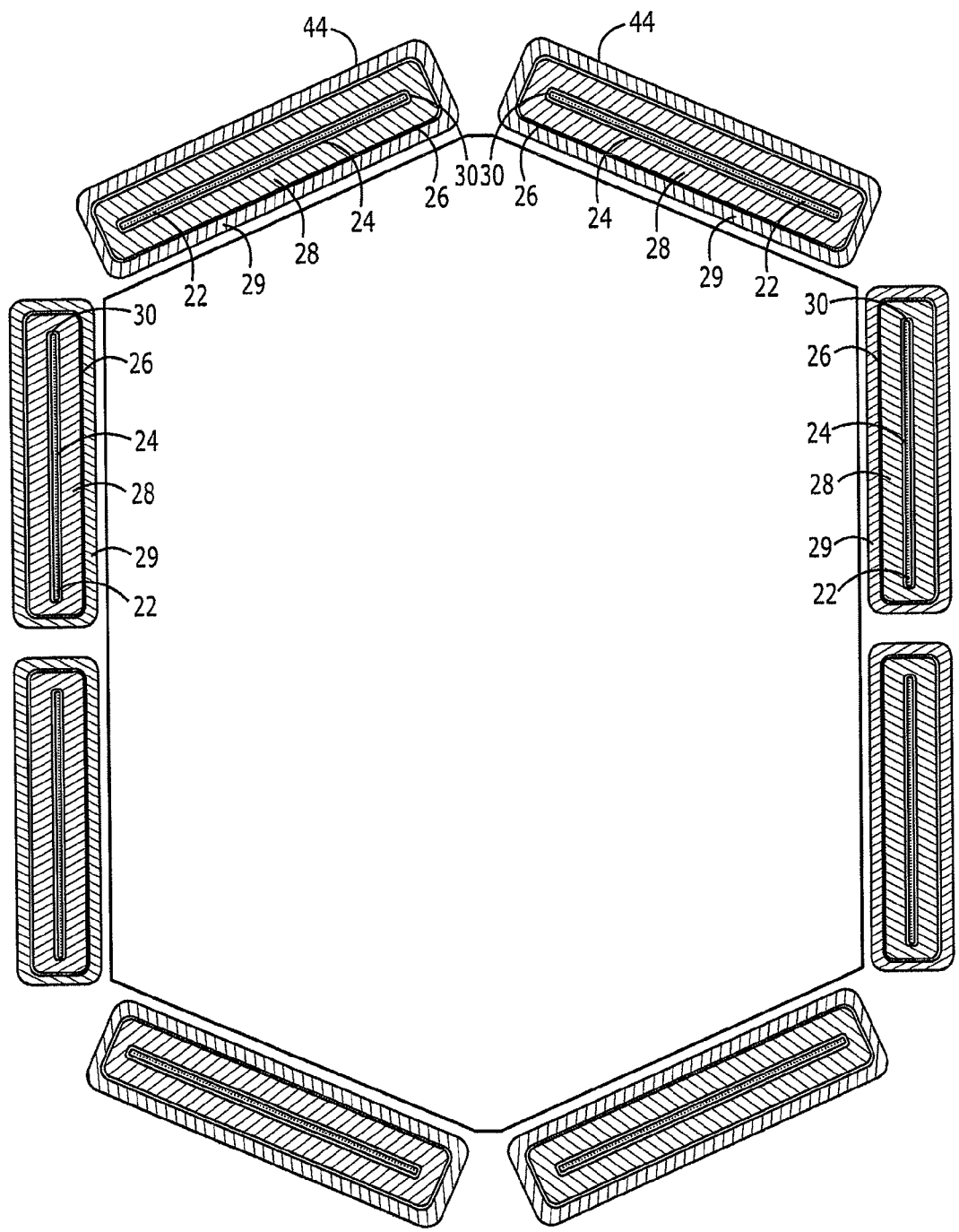
Figure 7:
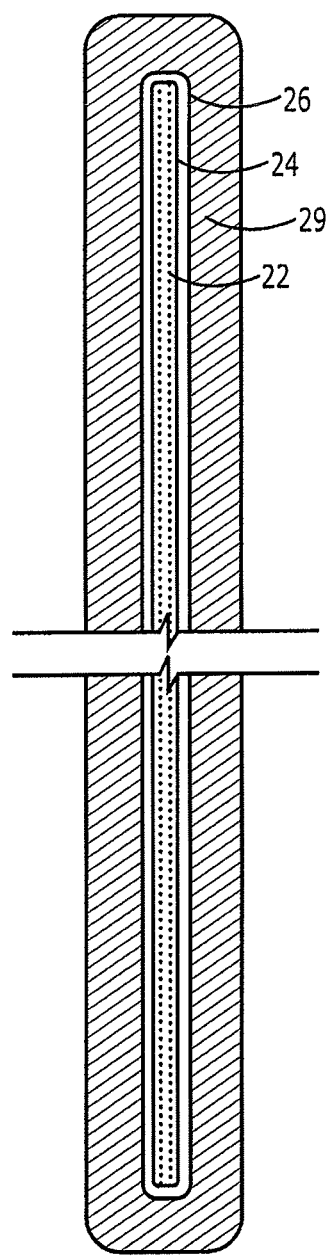
Figure 8:
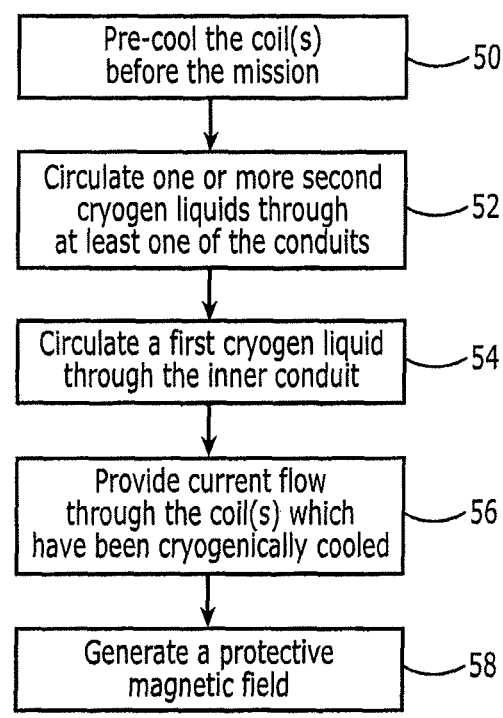

Having thus described embodiments of the disclosure in general terms, reference will now be made to the accompanying drawings, which are not necessarily drawn to scale, and wherein:

FIG. 1 is a cross-sectional view of the first and second shells of a radiation shield device in accordance with one embodiment of the present disclosure in which the magnetic flux lines generated by the first and second shells are illustrated;

FIG. 2 is a cross-sectional view of the radiation shield device of FIG. 1 illustrating, among other components, aspects of the thermal control system;

FIG. 3 is a cross-sectional view of a portion of the thermal control system of FIG. 2 illustrating the first and second conduits and the thermal insulation;

FIG. 4 is a cross-sectional view of a portion of a thermal control system of another embodiment of the present disclosure illustrating three nested conduits and the surrounding thermal insulation;

FIG. 5 is a block diagram of a radiation shield device in accordance with one embodiment of the present disclosure;

FIG. 6 is a plan view of a radiation shield device in accordance with another embodiment of the present disclosure in which the resulting magnetic flux lines are illustrated;

FIG. 7 is a cross-sectional view of the radiation shield device of FIG. 6 illustrating, among other components, aspects of the thermal control system; and FIG. 8 is a block diagram of the operations performed in accordance with a method of cryogenically cooling a radiation shield device in accordance with one embodiment of the present disclosure.

DETAILED DESCRIPTION

Embodiments of the present disclosure now will be described more fully hereinafter with reference to the accompanying drawings, in which some, but not all embodiments are shown. Indeed, these embodiments may be embodied in many different forms and should not be construed as limited to the embodiments set forth herein; rather, these embodiments are provided so that this disclosure will satisfy applicable legal requirements. Like numbers refer to like elements throughout.

Referring now to FIG. 1, the radiation shield device 10 in accordance with one embodiment of the present disclosure is illustrated. The radiation shield device 10 is generally described herein as providing protection from radiation for a manned space vehicle or a habitat for celestial bodies, particularly during CME events. However, further embodiments of the present disclosure may include radiation shield devices for any situation in which protection from particle radiation is desired beyond the earth's magnetosphere.

The radiation shield device 10 of the illustrated embodiment includes first and second shells 12, 14 that at least partially surround an area 16 to be shielded from radiation. In the illustrated embodiment, a space vehicle defines the area 16 to be shielded from radiation. A space vehicle may have various configurations, but the space vehicle of the illustrated embodiment has a cylindrical center portion and tapered end portions. A space vehicle may house one or more crew members as well as equipment, such as electronics, that may be sensitive to particle radiation. As shown in the illustrated embodiment, the first and second shells 12, 14 at least partially surround the space vehicle. As such, the first and second shells may somewhat follow the shape of the space vehicle. In this regard, the first and second shells 12, 14 of the illustrated embodiment have a medial cylindrical portion that encircles the cylindrical central portion of the space vehicle and opposed end portions that are tapered radially inward from the medial cylindrical portion so as to generally follow the tapered end portions of the space vehicle. The tapered end portions of the first and second shells 12, 14 may taper in a curved fashion as shown in the embodiment of FIG. 1. Alternatively, the end portions of the first and second shells 12, 14 may taper linearly or otherwise so as to more closely follow or conform to the tapered end portions of the space vehicle.

As shown in FIG. 1, the second shell 14 is spaced apart from the first shell 12 in such a manner that the second shell is further away from the area 16 to be shielded, such as the space vehicle, than the first shell. In this regard, the first shell 12 may be adjacent to the area 16 to be shielded and, in one embodiment, is attached or connected thereto, while the second shell 14 is spaced further from the area to be protected. As such, the radiation shield device 10 may include a truss network 18 between the first and second shells 12, 14 for connecting the second shell to the first shell and positioning the second shell relative to the first shell. In one embodiment, the truss network 18 is formed of a plurality of truss members extending between and connected to the first and second shells 12, 14. Although the truss network 18 may be formed of various materials, the truss elements of one embodiment may be formed of a composite material, such as a carbon reinforced matrix material in order to provide sufficient strength while limiting the weight of the truss network.

The second shell 14 may be larger than the first shell 12 as a result of the second shell being spaced further from the area 16 to be shielded and having, for example, a larger effective radius from the central axis 20 of the area to be shielded. However, the second shell 14 of one embodiment has the same or a comparable shape to that of the first shell 12, as shown in FIG. 1.

The first shell 12 includes a plurality of conductive coils that encircle the area 16 to be shielded. With respect to the embodiment of FIG. 1, the circles that graphically represent the first shell 12 are intended to be generally representative of one or more of the coils that encircle the area 16 to be shielded. Likewise, the second shell 14 includes a plurality of conductive coils that encircle the area 16 to be shielded from radiation as well as encircling the first shell 12. Again, the circles that graphically represent the second shell 14 in FIG. 1 are intended to be generally representative of one or more of the coils that encircle the area 16 to be shielded. Indeed, in one embodiment, both the first and second shells 12, 14 may include a substantially greater number of coils than the number of circles shown in FIG. 1.

As described below in conjunction with the thermal control system, the coils of each of the first and second shells 12, 14 may be arranged in coil groupings. In one embodiment, the coil groupings of the first shell 12 are paired with respective coil groupings of the second shell 14. Additionally, while the coil planes of the first and second shells 12, 14 of the illustrated embodiment are shown to be parallel and offset form one another, the coil planes of the first and second shells of other embodiments may be rotated with respect to one another, either with or without an offset.

The coils of one embodiment are formed of superconductive material. For example, the coils may be formed of a niobium titanium (NbTi) copper matrix multifilament superconducting wire winding. However, other embodiments of the present disclosure may include coils formed of alternative superconductive materials. In order to have superconductive properties, the superconductive material must be maintained at a temperature below its critical superconducting temperature onset level and as close to absolute zero as practical, preferably 36$b$ K or lower, more preferably less than 25 K and most preferably less than 10 K. As such, the radiation shield device 10 may include a thermal control system in thermal communication with the superconductive material of the coils to lower the temperature of the superconductive material to a desired temperature below its critical superconducting temperature onset level.

In operation, current is flowed through the coil groupings of the first shell 12 in one direction, such as a counterclockwise direction when looking down on the area 16 to be shielded from above. Conversely, current is flowed through the coil groupings of the second shell 14 in the opposite direction, such as in a clockwise direction when viewed down on the area 16 to be shielded from above. As a result of the current flow through the coils, a magnetic field is generated by each of the first and second shells 12, 14 which function as first and second solenoids, respectively. As a result of the current flowing through the first and second shells 12, 14 being in opposite directions, however, the north and south poles of the coil groupings of the first shell are correspondingly oriented opposite the north and south poles of the paired coil groupings of the second shell. With reference to the illustrated embodiment, for example, the north pole of the coil groupings of the first shell 12 may be at the upper end of the area 16 to be shielded and the south pole of the coil groupings of the first shell may be at the lower end of the area to be shielded, while the north pole of the coil groupings of the second shell 14 may be at the lower end of the area to be shielded and the south pole of the paired coil groupings of the second shell may be at the upper end of the area to be shielded.

Representative magnetic flux lines generated by the first and second shells 12, 14 are shown in FIG. 1. As a result of the opposite direction of the current flow through the coils of the first and second shells 12, 14, the magnetic fields generated by the current flow through the coils of the first and second shells offset one another within the area 16 to be shielded such that little or no magnetic field is generated therewithin. Thus, the radiation shield device 10 need not include an internal magnetic shield device to protect the interior of the area to be shielded from the magnetic fields generated by the radiation shield device itself. Accordingly, the weight of a space vehicle or the like may be reduced relative to space vehicles that require such an internal magnetic shield device.

In the region between the first and second shells 12, 14, the magnetic fields generated by the current flowing in opposite directions through the coils are directed in the same direction and are additive, thereby resulting in a stronger magnetic field between the first and second shells than that generated by either the first or the second shell individually. Further details regarding the radiation shield device 10 and the resulting magnetic field are provided by U.S. patent application Ser. No. 12/966,315 entitled "Radiation Shield Device and Associated Method", filed Dec. 13, 2010, the entire contents of which are incorporated by reference herein.

As noted above, the radiation shield device 10 includes a thermal control system for establishing and maintaining the temperature required for superconducting operation of the coils. In this regard, FIG. 2 illustrates one example embodiment of aspects of the thermal control system for controlling the temperature of the coils. It is noted, however, that the truss network is not shown in FIG. 2 so as to more clearly illustrate aspects of the thermal control system. Although each shell 12, 14 could be treated as a single unit for thermal control purposes, the plurality of coils of each shell may be broken into a plurality of groupings, such as the three groupings depicted in FIG. 2. Each grouping may, in turn, be separately cooled to temperatures sufficient to allow for superconducting operations. Although three groupings are shown for each shell in the embodiment of FIG. 2, a shell may include more or fewer coil groupings in other embodiments.

The thermal control system includes a first conduit 24 that extends about the area 16 to be shielded from radiation. In an embodiment in which the coils of a shell include two or more coil groupings, the thermal control system may include a first conduit, a third conduit, a fifth conduit, etc. (hereinafter generally referenced as "a first conduit" and designated as 24), one of which is associated with each coil grouping. As shown in FIG. 2 and, in more detail, in FIG. 3, the first conduit 24 houses the coils 22 for the respective coil grouping. The first conduit 24 is generally slightly larger than the coils 22 disposed therein such that a cryogen liquid may be circulated therethrough as described below. The first conduit 24 may be formed of various materials but, in one embodiment, is formed of material that does not react with the cryogen liquid, such as aluminum. A first conduit 24 may also have various shapes and configurations but, in the illustrated embodiment, has a length in the axial direction that is greater than its radial width such that the coils 22 housed within the first conduit may relatively uniformly encircle that portion of the area 16 to be shielded from radiation about which the first conduit extends.

As shown in FIG. 2 and, in more detail, in FIG. 3, the thermal control system also includes a second conduit 26 extending about the area 16 to be shielded from radiation. In an embodiment in which the coils of a shell include two or more coil groupings, the thermal control system may include a second conduit, a fourth conduit, a sixth conduit, etc. (hereinafter generally referenced as "a second conduit" and designated as 26), one of which is associated with each coil grouping. As shown, each first conduit 24 is disposed within a respective second conduit 26. As such, the second conduit 26 is generally larger than the first conduit 24, such as by having a greater length in the axial direction and a greater radial width, so that a cryogen liquid may be flowed therethrough. Although not necessary, the second conduit 26 may also have a shape that is consistent with or, in one embodiment, identical to that of the first conduit 24. The second conduit 26 may also be formed of various materials but, in one embodiment, is formed of a material that does not react with the cryogen liquid, such as the same material as the first conduit 24, e.g., aluminum.

The thermal control system may also include thermal insulation 28 surrounding each second conduit 26 for limiting thermal transfer between the second conduit and the environment. Although the thermal insulation 28 may be formed of various materials, the thermal insulation of one embodiment is formed of a layered composite insulation with paper.

With the exception of predefined inlets and outlets for controllably introducing and removing cryogen liquids, the first and second conduits 24, 26 are watertight such that a cryogen liquid circulated through the first conduit remains within the first conduit and does not leak into the second conduit. Likewise, a cryogen liquid circulated within the second conduit 26 exterior of the first conduit 24 does not leak into the first conduit and, instead, remains within the second conduit.

In operation, cryogen liquids may be circulated through the first and second conduits 24, 26 in order to lower the temperature of the superconductive material of the coils 22 to a temperature below the critical superconducting temperature onset level and to thereafter maintain the temperature of the superconductive material of the coils at that relatively low temperature. As a result of the thermal control system and associated method of operation of embodiments of the present disclosure, the coils 22 may be efficiently cryogenically cooled in a manner that is sensitive to the weight that is required to be carried by the space vehicle.

As described above in conjunction with the embodiment of FIGS. 2 and 3, the thermal control system may include two nested conduits, with each first conduit 24 disposed within a respective second conduit 26. However, other embodiments of the thermal control system of the present disclosure may include additional conduits arranged in a nested fashion such that interior conduit(s) are disposed within exterior conduit (s). By way of example, FIG. 4 illustrates another embodiment of a thermal control system that has three nested conduits, namely, a first conduit 24 in which the coils 22 are disposed, a second conduit 26 within which the first conduit is disposed and an outer conduit 30 within which both the first and second conduits are disposed. The outer conduit 30 may, in turn, be surrounded by insulation 32, such as a layered composite insulation with paper. In the illustrated embodiment, the second conduit 26 is also surrounded by insulation 28 such that the second and outer conduits are spaced apart from one another by the insulation.

As described below, cryogen liquids may be circulated through each of the conduits in order to efficiently cool the coils 22 to a temperature sufficiently low for superconducting operations. Although any additional conduits may be formed to have different shapes and to be formed of different materials, the outer conduit 30 of the embodiment illustrated in FIG. 4 has a common shape with those of the first and second conduits 24, 26 and is formed of the same material as the first and second conduits, such as a material that does not react with the cryogen liquid, e.g., aluminum.

Although the radiation shield device 10 may be configured in various fashions, the radiation shield device of one embodiment includes a power source 34 as shown in FIG. 5. The power source 34 is in communication with the first and second shells 12, 14, such as the plurality of coils of the first and second shells such that actuation of the power source causes current to flow through the coils of the first and second shells in the desired directions. The radiation shield device 10 of one embodiment is an active device such that the power supply 34 may alternately cause current to flow through the coils of the first and second shells 12, 14 in order to generate a protective magnetic field or cease the current flow through the coils of the first and second shells in order to no longer generate the protective magnetic field. As such, the power supply 34 may be configured to be actuated in instances in which approaching particle radiation is detected such that current flow is initiated and the protective magnetic field is generated prior to the particle radiation impinging upon the area 16 to be protected, such as a space vehicle. Once the particle radiation has dissipated, however, the power source 22 may be deactuated, thereby conserving energy until the next time that a protective magnetic field is to be generated.

The radiation shield device 10 of the embodiment of FIG. 5 may also include a source 36 of the cryogen liquids, the controlled circulation of which lowers the temperature of the superconductive material of the coils to a temperature below its critical superconducting temperature onset level prior to or concurrent with the flow of current therethrough. In one embodiment, a separate source, such as a tank, is provided for each cryogen liquid. In one embodiment, however, the sources of the cryogen liquids are combined. In this regard, the cryogen liquids are maintained separate from one another, but the tanks that store and supply the different cryogen liquids are nested in a comparable fashion to the conduits. In this regard, the cryogen liquid having the lowest boiling point, such as liquid helium, may be stored in an innermost tank 36a. The innermost tank 36a may be disposed within a second tank 36b that stores the cryogen liquid having the next lowest boiling point, such as liquid hydrogen. The source 36 of this embodiment would generally have the same number of nested tanks as the number of different cryogen liquids. Thus, while the source 36 of cryogen liquids of the embodiment of FIG. 5 has two nested tanks 36a, 36b, the source may include three or more nested tanks in other embodiments such that the first and second tanks may, in turn, be disposed within a third tank that stores the cryogen liquid having the third lowest boiling point, such as liquid nitrogen. If additional cryogen liquids are utilized by the thermal control system, the source 36 may have additional tanks for storing the cryogen liquids with the sequence or nesting of the tanks based upon the relative boiling points of the cryogen liquids with the tanks ranging from an innermost tank 36a storing the cryogen liquid having the lowest boiling point to an outermost tank storing the cryogen liquid having the highest boiling point. Each tank may be individually connected to the conduit(s) through which the respective cryogen liquid is to circulate.

The radiation shield device 10 may also include a controller 38 for controlling the valves or other control devices that selectively allow the flow of cryogen liquids through the different conduits. In one embodiment, the thermal control system is active in that the thermal control system is alternately activated and inactivated with the thermal control system being activated in response to predefined events, such as the detection of approaching particle radiation. In this regard, the thermal control system may be activated so as to lower the temperature of the coils 22 to enable superconducting operation and the generation of a protective magnetic field about the area 16 to be protected prior to the arrival of the particle radiation. Once the particle radiation has dissipated, the thermal control system may be deactivated, thereby conserving energy and reducing the quantity and, therefore, the weight of the cryogen liquid required to cool the coils 22.

As shown in FIG. 2, the thermal control system of one embodiment may divide the coils into two or more groupings, each of which is surrounded by two or more conduits carrying cryogen liquids. Although each coil grouping may be cooled in the same fashion utilizing the same cryogen liquids in each respective conduit, different coil groupings may be cooled utilizing different cryogen liquids in some embodiments. For example, the thermal control system of one embodiment may circulate a second cryogen liquid, e.g., liquid hydrogen, through the second conduit 26 associated with one coil grouping and a third cryogen liquid, e.g., liquid oxygen, through the second conduit associated with another coil grouping. While the circulation of either liquid hydrogen or liquid oxygen reduces the temperature of the coils 22 within the respective first conduit 24, the boil-off of the liquid hydrogen and the liquid oxygen that it caused as a result of the absorption of heat from the coils may be combined and utilized productively, as shown in the embodiment of FIG. 5. In this regard, the boil-off of the liquid oxygen from one coil grouping of the thermal control system and the boil-off of the liquid hydrogen from another coil grouping of the thermal control system may be provided to a fuel cell 40. The fuel cell 40, in turn, may combine the boil-off of the liquid oxygen and the boil-off of the liquid hydrogen to generate electricity and/or to generate drinking water which may be utilized to facilitate operation and habitation of the space vehicle.

A radiation shield device 30 of another embodiment is shown in FIGS. 6 and 7. In this embodiment, the radiation shield device 10 does not include first and second shells. Instead, the radiation shield device 10 includes two or more cylindrical coils 42 extending about and encircling the center cylindrical portion of an area 16 to be shielded, such as a space vehicle, and a pair of trapezoidal coils 44 extending about and encircling portions of the opposed trapezoidal end portions of the area to be shielded. Each of the coils may include a plurality of coils formed of a superconductive material. In operation, current may be caused to flow and through the coils in the same direction and a magnetic field may be generated as shown by the magnetic flux lines of FIG. 6. The magnetic field generated by the radiation shield device 10 of this embodiment also protects against particle radiation. However, the magnetic field generated by the radiation shield device 10 of this embodiment extends through and creates a magnetic field within the area 16 to be shielded, such as within the space vehicle.

As shown in cross-section FIG. 7, the radiation shield device 10 of this embodiment may also include a thermal control system with the windings that comprise each respective coil being disposed within a respective first conduit 24. As before, each of the first conduits 24 is disposed within a respective second conduit 26 which, in turn, is surrounded by thermal insulation 28. By circulating cryogen liquids through the respective conduits, the coils may be cooled so as to facilitate superconducting operation.

Referring now to FIG. 8 and, in particular, to operation 50, a method of cryogenically cooling a radiation shield device 10 is illustrated. In one embodiment, the coils of the radiation shield device 10 may be pre-cooled, such as to a temperature capable of supporting a superconducting operation or to a temperature at least cooler than ambient, prior to commencement of a mission, such as prior to launch of the space vehicle. Although the coils need not be pre-cooled in all embodiments, pre-cooling the coils reduces the cooling that is subsequently required during the mission and may therefore reduce the amount of cryogen liquids that are required to be carried onboard the space vehicle, thereby advantageously reducing the weight.

Once the mission has begun, and regardless of whether the coils were pre-cooled prior to the mission, a determination may be made, such as by the controller 38, that the coils are to be cooled to a sufficiently low temperature to support superconducting operation. For example, the controller 38 may detect or otherwise determine that particle radiation is approaching the space vehicle and may desire to generate a protective magnetic field. Thus, prior to the arrival of the particle radiation, the controller 38 may issue instructions to the thermal control system regarding the circulation of a cryogen liquid required to cryogenically cool the coils. In the embodiment illustrated in FIG. 8, one or more second cryogen liquids are initially circulated through the second conduit 26. See operation 52. Although the second cryogen liquid circulated through the second conduit 26 may be the same as the first cryogen liquid circulated through the first conduit 24, the second cryogen liquids circulated through the second conduit in one embodiment have a higher boiling point than the first cryogen liquid circulated through the first conduit. While a variety of second cryogen liquids may be circulated through the second conduit 26, examples of cryogen liquids that may be circulated through the second conduit include liquid oxygen, liquid nitrogen and liquid hydrogen.

In order to increase the efficiency with which the coils are cooled, the thermal control system may be configured to sequentially circulate different cryogen liquids through the second conduit 26. In this embodiment, the cryogen liquids that are sequentially circulated through the second conduit 26 may be sequenced based upon the respective boiling points of the cryogen liquids and, in particular, in order of descending boiling point. As such, from among the cryogen liquids to be circulated through the second conduit 26, the cryogen liquid having the highest boiling point is initially circulated through the second conduit, the cryogen liquid having the next highest boiling point is next circulated through the second conduit, and so on until the cryogen liquid having the lowest boiling point is circulated through the second conduit. In one example in which liquid oxygen, liquid nitrogen, and liquid hydrogen are circulated through the second conduit 26, liquid oxygen having a boiling point of −183° C. may initially be circulated through the second conduit. Once the liquid oxygen has lowered the temperature of the coils to about −183° C., the liquid oxygen may be replaced with liquid nitrogen having a boiling point of about −198° C. Once the liquid nitrogen has lowered the temperature of the coils to about −198° C., the liquid nitrogen may be replaced with liquid hydrogen having a boiling point of about −253° C., with the circulation of the liquid hydrogen continuing until the temperature of the coils has been lowered to about −253° C.

As shown in operation 54 of FIG. 8, a first cryogen liquid may also be circulated through the first conduit 24 in which the coils 22 are disposed. Although the first cryogen liquid may be circulated through the first conduit 24 concurrent with the circulation of a second cryogen liquid through the second conduit 26, the circulation of the first cryogen liquid through the first conduit is initiated, in one embodiment, once the circulation of the second cryogen liquids through the second conduit has lowered the temperature of the coils 22, such as to or near the boiling point of the second cryogen liquid, e.g., to at or near the lowest boiling point of the second cryogen liquids, such as −253° C. in an instance in which liquid hydrogen is circulated through the second conduit. By initially lowering the temperature of the coils 22 by circulation of the second cryogen liquid through the second conduit 26 prior to introducing the first cryogen liquid into the first conduit 24, the coils more efficiently cooled. In this regard, although the second cryogen liquids circulated through the second conduit 26 may have higher boiling points than the first cryogen liquid, such as liquid helium, circulating through the first conduit 24, the latent heat of the second cryogen liquids circulated through the second conduit may be larger than the latent heat of the first cryogen liquid circulated through the first conduit such that the second cryogen liquids may absorb more heat from the coils and cool the coils more efficiently and more rapidly than the first cryogen liquid. In this regard, the latent heat of second cryogen liquids such as liquid oxygen, liquid nitrogen, and liquid hydrogen are 213 kJ/kg-K, 200 kJ/kg-K, and 455 kJ/kg-K, respectively, while the latent heat of a first cryogen liquid such as liquid hydrogen is about 21 kJ/kg-K.

Thus, the bulk of the cooling may be performed with the second cryogen liquids that can efficiently lower the temperature of the coils 22 a substantial amount, even though the second cryogen liquids may not be able to completely lower the temperature of the coils to the desired temperature for superconducting operations. Once the second cryogen liquids have lowered the temperature of the coils 22 a substantial amount, such as to or near the lowest boiling point of the second cryogen liquids, such as −253° C. in one embodiment, the first cryogen liquid may be circulated through the first conduit 24 in order to further reduce the temperature of the coils to a temperature sufficient for superconducting operations, such as to −269° C. in an instance in which the first cryogen liquid is liquid helium. This efficient multi-stage cooling of the coils to the desired temperature for superconducting operations also permits the coils to be cooled in a manner that requires less coolant in terms of weight and/or volume, thereby reducing the quantity of coolant that the space vehicle, for example, must transport.

Once the temperature of the coils 22 has been lowered so as to support superconducting operation, current may be provided to the coils by the power source 34 as shown in operation 56 with the direction of the current through the coils being controlled as described above. Based upon the flow of current through the coils and the direction of the current flow, a protective magnetic field may be generated about the space vehicle. See operation 58 of FIG. 8. In order to maintain the coils 22 at a temperature that is sufficiently low to support superconducting operations, the first and second cryogen liquids may continue to be circulated with the boil-off of the first cryogen liquid serving to overcome the internal heat or the heat transported in the first cryogen liquid through the insulation 28 external to the first conduit 24, while the boil-off of the second cryogen liquid serves to overcome the heat absorbed from the ambient atmosphere.

As such, the area 16, such as a space vehicle, may be shielded from radiation utilizing coils formed of a superconductive material that are efficiently cooled in a manner that limits the quantity of coolant that is required. Further, the method may shield an area 16 from radiation without requiring substantial energy for operation. In this regard, the method of shielding an area 16 from radiation may be activated in response to detection of approaching particle radiation, but may be deactuated, thereby conserving energy, in instances in which particle radiation is not imminent.

Many modifications and other embodiments of the present disclosure set forth herein will come to mind to one skilled in the art to which these embodiments pertain having the benefit of the teachings presented in the foregoing descriptions and the associated drawings. Therefore, it is to be understood that the present disclosure is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:
1. A space vehicle comprising:
a capsule; and
a radiation shield device comprising:
at least one first coil comprised of a superconductive material;
first and second conduits extending about the capsule, wherein the at least one first coil is disposed within the first conduit so as to also extend within the first conduit about the area to be shielded from radiation, and wherein the first conduit is disposed within the second conduit;

first and second cryogen liquids disposed within the first and second conduits, respectively, wherein the second cryogen liquid is disposed within the second conduit exterior of the first conduit, and wherein the first cryogen liquid has a lower boiling point than the second cryogen liquid;

at least one second coil comprised of a superconductive material;

third and fourth conduits extending about the capsule and also extending about the first and second conduits, wherein the at least one second coil is disposed within the third conduit so as to extend within the third conduit about the capsule, and wherein the third conduit is disposed within the fourth conduit; and first and third cryogen liquids disposed within the third conduit and the fourth conduit, respectively, wherein the third cryogen liquid is different than the first and second cryogen liquids.

2. The space vehicle according to claim 1 wherein the first cryogen liquid comprises liquid helium and the second cryogen liquid comprises one of liquid oxygen, liquid nitrogen or liquid hydrogen.

3. The space vehicle according to claim 1 wherein the second cryogen liquid comprises liquid hydrogen and the third cryogen liquid comprises liquid oxygen, and wherein the space vehicle further comprises a fuel cell configured to receive boil off of the second and third cryogen liquids.

4. The space vehicle according to claim 1 wherein the at least one first coil is spaced apart from the at least one second coil.

5. The space vehicle according to claim 1 wherein the radiation shield device further comprises thermal insulation surrounding the second conduit.

6. The space vehicle according to claim 5 wherein the radiation shield device further comprises a first intermediate conduit extending about the capsule, wherein the first conduit is disposed within the first intermediate conduit, and wherein the first intermediate conduit is disposed within the thermal insulation and the second conduit.

7. The space vehicle according to claim 1 wherein the first conduit is larger than the first coil.

8. The space vehicle according to claim 1 wherein the third conduit is larger than the second coil.

9. The space vehicle according to claim 1 wherein at least one first coil is comprised of a niobium titanium (NbTi) copper matrix multifilament superconducting wire winding.

10. The space vehicle according to claim 1 wherein at least one second coil is comprised of a niobium titanium (NbTi) copper matrix multifilament superconducting wire winding.

11. The space vehicle according to claim 1 further comprising a thermal control system in thermal communication with the superconductive material of the at least one first and second coils.

12. The space vehicle according to claim 1 wherein the at least one first conduit has a length in an axial direction that is greater than a radial width of the at least one first conduit.

13. The space vehicle according to claim 12 wherein the at least one second conduit has a length in the axial direction that is greater than the length of the at least one first conduit, and wherein the at least one second conduit has a radial width that is greater than the radial width of the at least one first conduit.

14. The space vehicle according to claim 1 wherein the at least one first and second conduits are formed of aluminum.

15. The space vehicle according to claim 1 further comprising a power source in communication with the at least one first and second coils.

16. The space vehicle according to claim 1 further comprising a source of the first, second and third cryogen liquids.

17. The space vehicle according to claim 16 wherein the source of the first, second and third cryogen liquids comprises a plurality of tanks configured to store the first, second and third cryogen liquids.

18. The space vehicle according to claim 17 wherein the plurality of tanks are nested.

19. The space vehicle according to claim 1 further comprising a controller for controlling flow of the first, second and third cryogen liquids through the first, second, third and fourth conduits.

20. The space vehicle according to claim 19 wherein the controller is configured to determine that particle radiation is approaching and to issue instructions regarding circulation of the first, second and third cryogen liquids.

* * * * *